United States Patent Office 3,581,403
Patented June 1, 1971

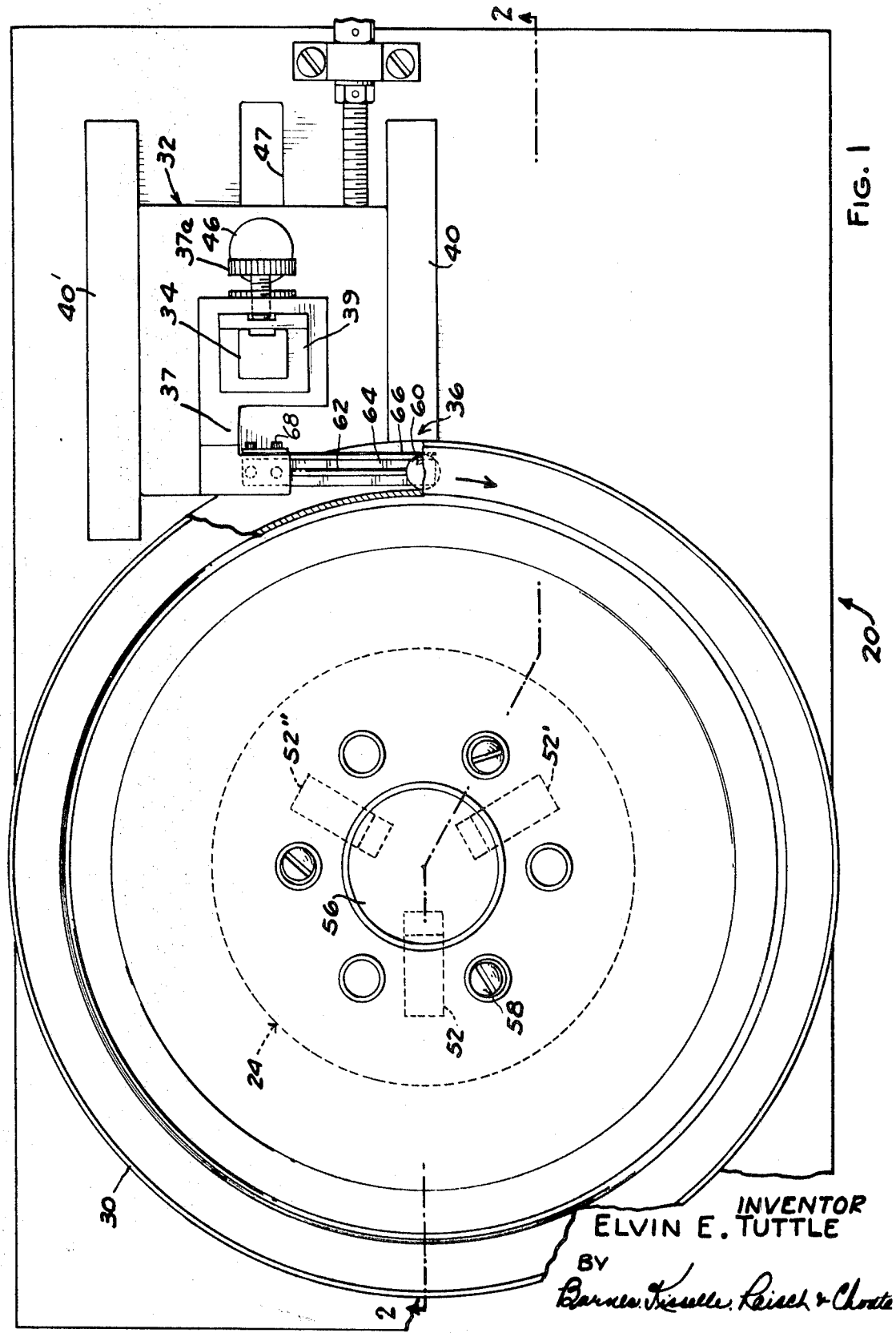

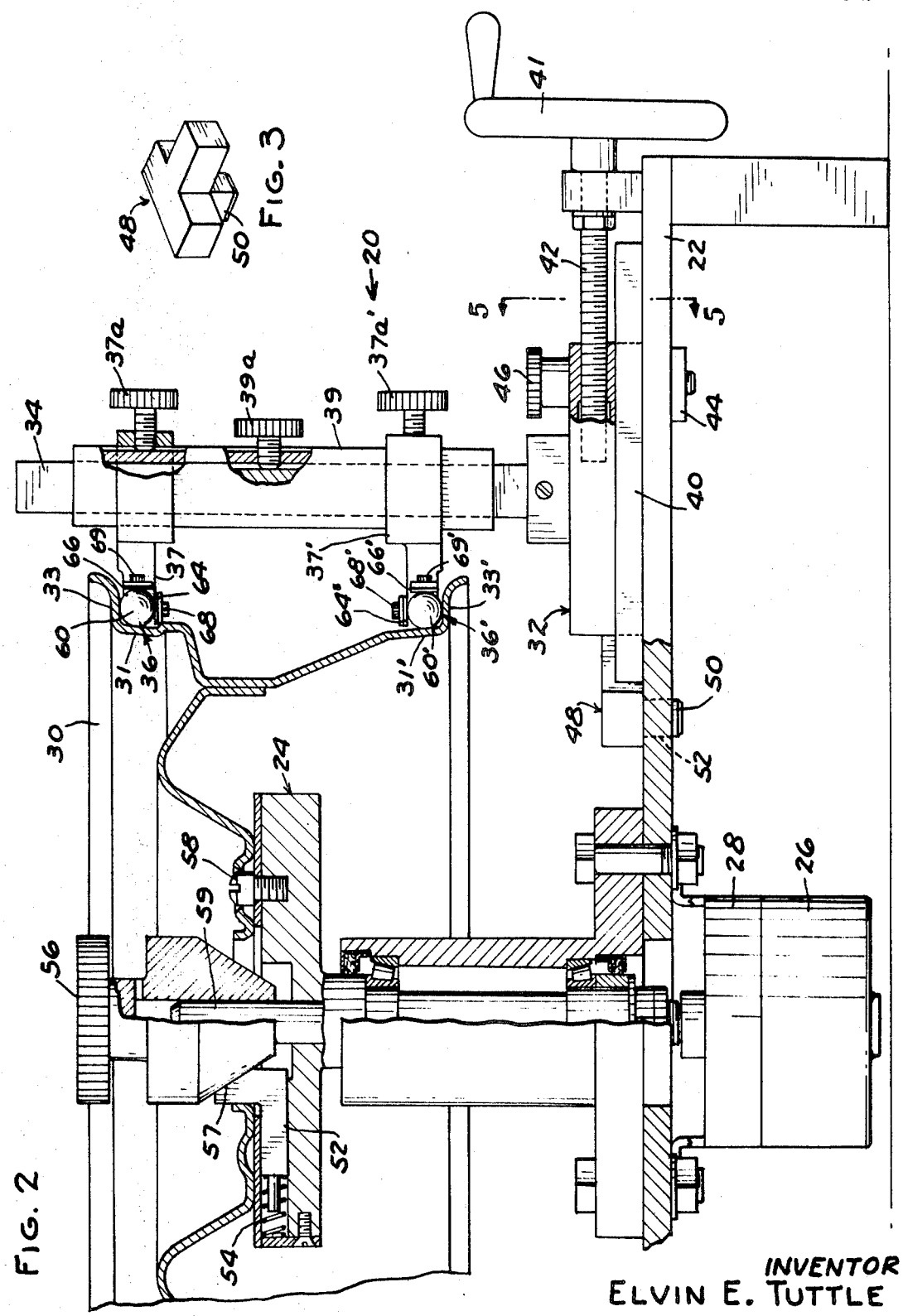

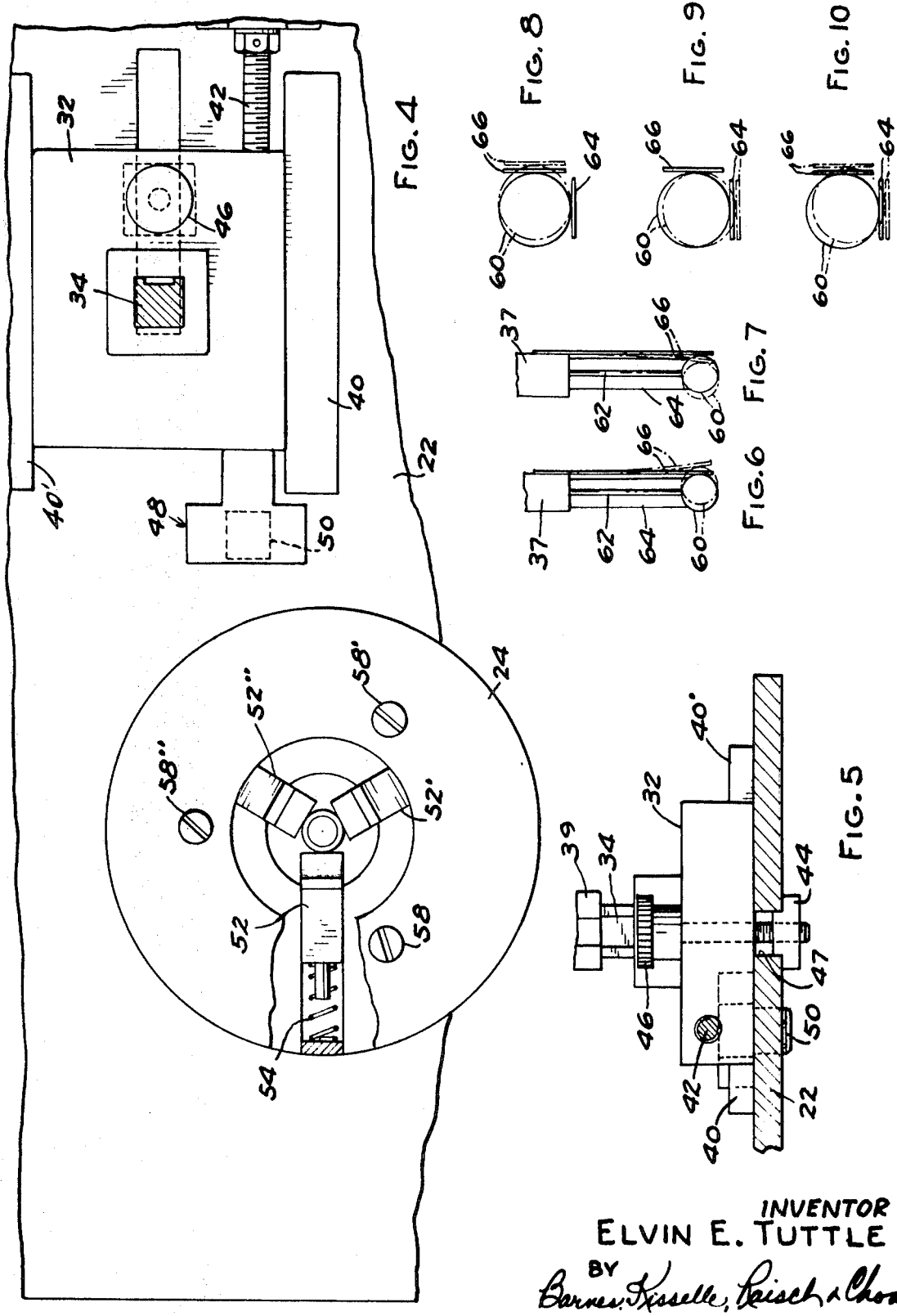

3,581,403
WHEEL RIM RUNOUT MEASURING APPARATUS
Elvin E. Tuttle, Lansing, Mich., assignor to
Motor Wheel Corporation
Filed Sept. 12, 1968, Ser. No. 759,317
Int. Cl. G01b 13/18
U.S. Cl. 33—203.16                        8 Claims

ABSTRACT OF THE DISCLOSURE

A machine for sensing the runout of the bead seat of an automotive vehicle wheel rim by probing the contoured inside corner surfaces of the tire bead retaining and supporting portion of the wheel rim while it is being rotated. The sensing device comprises a probe yieldably urged into engagement with said surfaces of the wheel rim by a spring steel wire on which a sliding ball contactor of the probe is mounted. Two strain gaged cantilever leaf springs are positioned so that they continuously slidably engage the ball near their free ends, the leaves being disposed with their wider flat sides transverse to each other so as to lie respectively in planes paralled and perpendicular to the axis of rotation of the wheel rim. The leaves serve as deflection responsive electrical transducers, one leaf being responsive only to radial runout and the other leaf only to lateral runout.

---

This invention relates to devices for measuring wheel rim runout and more particularly to a device for determining the radial and lateral runout of an automotive vehicle wheel rim of the type which receives a pneumatic tire.

Wheel runout measuring devices usually measure the radial and lateral runout of a wheel rim by indicators which are mounted so that they do not track or follow, when the wheel is rotated, in the path or position which a tire bead will assume when it is mounted on the rim. In a typical wheel rim the surface underlying the edge of the tire bead (bead seat) is at an angle of 5° to the wheel axis and the lateral surface adjacent to the outer side of the bead (bead retaining flange) is at an angle of 2° with a plane perpendicular to the wheel axis. Hence, if there is lateral runout of the bead flange of the wheel the bead seat will shift under a fixed radial indicator probe, thereby causing a false radial runout indication. In a similar manner, firadial runout in the bead seat of the wheel rim will cause a false lateral runout indication when measured by a fixed axial deflection responsive probe.

An object of this invention is to provide a more accurate means of determining the radial and axial runout of a wheel rim.

Another object of this invention is to provide a mechanical means of separating radial and axial runout components sensed by a single contactor type probe.

Another object of this invention is to provide a device of the above character consisting of a few relatively simple components and hence of economical construction and assembly, and which is extremely durable and dependable in operation hence suitable for use in a high speed automated production wheel runout sensing machine.

Other objects, features and advantages of this invention will be apparent from the following detailed description and accompanying drawings in which:

FIG. 1 is a plan view of a wheel runout measuring machine equipped with a sensing device of this invention, a portion of one bead retaining flange being broken away to illustrate one of the sensing devices.

FIG. 2 is a vertical sectional view on line 2—2 of FIG. 1 illustrating a dual sensing device arrangement of this invention in engagement with both bead seat inside corner contours of a wheel rim.

FIG. 3 is a perspective view of a variable length stop block of the machine.

FIG. 4 is a partial plan view of the runout machine of FIG 1 with portions shown in horizontal section and with the wheel removed.

FIG. 5 is a vertical section on line 5—5 of FIG. 2 illustrating the bed and cross head carrying the sensing devices of this invention.

FIGS. 6 and 7 are fragmentary plan views indicating various positions of the ball and leaf springs of the sensing device of this invention.

FIGS. 8, 9 and 10 are diagrammatic end views of the position of the ball and leaf transducer of the sensing device when it is sensing respectively lateral runout only, radial runout only, and both radial and lateral runout.

As shown in FIGS. 1 and 2, an exemplary but preferred wheel runout measuring machine of the present invention, designated generally as 20, is formed with a bed 22, on which a chuck 24, driven by a motor 26 through a gear train 28, is mounted to provide a means for supporting and rotating a conventional drop center rim wheel 30 about a fixed axis, nominally the design axis of rotation of the wheel in use. A carriage 32 with a post 34 is movably mounted on bed 22 to provide a means for positioning a pair of identical snesing devices 36 and 36' so that they can engage the inner surfaces of the rim corner contour formed by generally axially and radially extending rim portions 31 and 33 (commonly referred to as the "bead seat" and "flange" respectively) of wheel rim 30. Sensing devices 36 and 36' are adjustably mounted on carriage 32 by sleeves 37 and 37' and a common bracket 39 and associated clamping screws 37a, 37a' and 39a so that devices 36 and 36' can be positioned to accommodate different size wheel rims and retracted or moved away from wheel rim 30 to facilitate removal of the wheel rim from chuck 24.

As shown in FIG. 5, carriage 32 rides between two ways 40 and 40' and is reciprocated by a lead screw 42 operated by a hand wheel 41. A key plate 44 and a threaded bolt 46 extending through a slot 47 in bed 22 releasably clamp carriage 32 in adjusted position to bed 22. A stop block 48 with a square peg 50 is inserted in a square hole 52 to provide a positive stop for carriage 32 when it traverses toward chuck 24. As shown in FIG. 3, stop block 48 is formed with three legs each of a different length to provide positive stops for various size wheel rims 30.

As shown in FIGS. 1, 2 and 4, chuck 24 is formed with three equally angularly spaced, axially aligned dogs 52, 52' and 52" each biased radially inwardly in its respective radial slot toward the center of the chuck by a spring 54. Dogs 52, 52' and 52" are urged radially outwardly into clamping engagement with wheel rim 30 by a weight 56 which is slidably received on a post 59 to cause a conical surface 57 of the weight to cam the dogs 52 apart and to thereby center the wheel on chuck 24. A cap screw 58 provides a pilot for initially aligning wheel 30 on chuck 24.

As shown in FIGS. 1, 2 and 6, sensing device 36 comprises a contactor 60 preferably in the form of a spherical ball fixed on the free end of a spring steel wire 62 which in turn is connected at its other end to bracket 37. Two plate-like members, preferably comprising flat spring steel leaves 64 and 66, are cantilever mounted on bracket 37 by screws 68 and 69 respectively, and are positioned so that they lie generally parallel to wire 62 and slidably engage ball 60 near their free ends. As shown by the solid and phantom line positions in FIGS. 6 and 7, leaves 64 and 66 continue to engage ball 60 regardless of the direction in which it is displaced from its normal or at rest position (solid lines). Leaf 66 is positioned so that it lies in a plane parallel to the axis of rotation of wheel 30 on chuck 24, and leaf 64 is positioned so that it lies in a plane perpendicular to the axis of rotation of wheel 30 on chuck 24. The displacement of leaves 64 and 66 caused by movement of ball 60 as it in turn is displaced by the lateral and/or radial shift of the associated rim corner during rotation of wheel 30 is translated into two discrete electrical signals respectively proportional to the displacement of the associated leaf by mounting conventional variable resistance wire strain gages of the Baldwin bonded type (one-dimensional grid) (not shown) on the leaves. The theory and proper use of such strain gages is well known and therefore not set forth herein; see for example "An Introduction to Experimental Stress Analysis" by George H. Lee, pp. 113–147 inclusive, John Wiley & Sons, Inc., New York, 1950. Alternatively, the displacement of the leaves may be measured mechanically by two separate dial indicators (not shown) with probes overlying and engaging leaves 64 and 66 respectively.

In operating runout machine 20, a wheel 30 is positioned on and secured to chuck 24 with its mounting bolt circle concentric with the chuck axis. Sensing units 36 and 36' are positioned so that balls 60 and 60' thereof engage simultaneously the opposite inside corners of the rim of the wheel 30. Due to the spring biasing force of spring wire 62 and, to a lesser extent, that of leaves 64 and 66, ball 60 will be urged both radially inwardly and axially toward the rim flange so as to seat in the rim corner and thus will always remain in sliding engagement with the bead supporting and retaining surfaces of bead seat 31 and flange 33 while wheel 30 is rotated. As indicated in FIG. 8, if wheel 30 contains only radial runout as viewed by the tire bead, ball 60 will be displaced only in a radial direction with respect to the rotational axis of wheel 30. Hence ball 60 will merely slide across leaf 64 without displacing the same, moving only leaf 66 as indicated by the phantom position of the ball 60 and leaf 66 in FIG. 8. As shown in FIG. 9, if wheel 30 contains only lateral (axial) runout in the rim flange, ball 60 will be displaced only in an axial direction, which will cause it to merely slide along leaf 66 and displaces only leaf 64 as shown by the phantom position of ball 60 and leaf 64 in FIG. 9. As shown in FIG. 10, if wheel 30 contains both radial and lateral runout, ball 60 will be displaced along a path that is inclined with respect to both radial and axial directions and will displace both leaves 64 and 66 as shown by the phantom position of the ball and both leaves in FIG. 10.

Since leaf 66 is only displaced by radial runout as viewed by the tire bead and leaf 64 is displaced only by lateral runout as viewed by the tire bead, the ball and leaf arrangement provides a structure which mechanically separates or isolates the radial and axial runout so that the magnitude of each component can be individually measured. Since ball 60 always remains in contact with both inside surfaces of bead seat 31 and flange 33 while wheel 30 is being rotated, the possibility of a false signal or measurement, due to the inclination of surfaces 31 and 33 relative to the axis and radial plane of wheel 30 respectively, is eliminated. Moreover, since ball 60 is always in contact with the surfaces of bead seat 31 and flange 33 which will be engaged by the bead of the tire when it is assembled and inflated on the rim, the radial and axial components of runout sensed by leaves 66 and 64 more accurately correspond respectively to the vertical and horizontal components of wheel rim runout transmitted by the wheel rim to the axle hub of a moving vehicle on which the wheel rim is mounted.

The strain gaged leaves 64 and 66 and resiliently mounted ball 60 provide a sensing device and mechanical-electrical transducer having only a few relatively simple component parts which mechanically isolate the radial and lateral components of wheel runout so that the magnitude of these components can be readily and easily measured. Hence this sensing unit provides the accuracy of a laboratory instrument and yet due to its few component parts can be ruggedly and economically constructed so that it is sufficiently reliable and durable to be used as an automated high capacity runout checking machine in production quality control.

What is claimed is:

1. Apparatus for sensing and separating into axial and radial components the runout of first and second generally cylindrical adjacent inclined surfaces of a workpiece in which at least one of the surfaces is obliquely inclined with respect to an axis of the workpiece which comprises:
    (a) a base,
    (b) a contactor simultaneously engageable with both of said surfaces, said contactor being mounted on said base for movement generally transverse to both of said surfaces and yieldably urged toward engagement with both of the surfaces,
    (c) first and second deflection sensing means comprising generally flat leaves of a resilient material connected at one end to said base inclined with respect to each other and respectively generally juxtaposed to said first and second surfaces with their free ends in sliding contact with said contactor and yieldably urged into engagement with said contactor so that said contactor is interposed between both of said leaves and said surfaces, and
    (d) means for mounting the workpiece for rotation about an axis of rotation of said workpiece in a direction generally parallel to said surfaces at the point of contact thereof with said contactor.

2. The apparatus as defined in claim 1 in which said contactor comprises a body having a generally spherical surface area disposed for sliding contact with said surfaces of said workpiece.

3. Apparatus for sensing the runout of a bead seat retaining and supporting portion of a rim of a wheel defined by bead seat and bead retaining surfaces at least one of which is obliquely inclined with respect to the axis of rotation of the wheel which comprises:
    (a) a base,
    (b) a contactor simultaneously engageable with both of said surfaces, said contactor being mounted on said base for movement generally transverse to said surfaces and being yieldably biased into engagement with said surfaces,
    (c) first and second deflection sensing means comprising flexible leaves cantilevered on said base and slidably engaging said contactor adjacent their free ends at points disposed generally opposite the points of contact of said contactor with said bead seat and flange surfaces respectively so that said contactor is interposed between said sensing means and said surfaces, and
    (d) means for mounting the wheel for rotation about the design axis of rotation of the wheel.

4. The apparatus as defined in claim 3 in which each leaf comprises a strip of a resilient material yieldably biasing said contactor against the one of said surfaces facing said leaf.

5. The apparatus as defined in claim 4 in which said first leaf lies in a plane parallel to the axis of rotation of the wheel and said second leaf lies in a plane perpendicular to the axis of rotation of the wheel.

6. The apparatus as defined in claim 5 in which said contactor comprises a spring steel wire cantilever mounted at one end on said base and having a free end, and a ball mounted on said free end of said wire and biased by said wire into sliding contact with said bead seat and flange surfaces.

7. Apparatus for sensing the runout of a bead seat retaining and supporting portion of a rim of a wheel defined by bead seat and bead retaining surfaces at least one of which is obliquely inclined with respect to the axis of rotation of the wheel which comprises; a base, means on said base for mounting the wheel for rotation about the axis of the wheel, a contactor adapted for simultaneously bearing on both the bead seat and retaining surfaces of a portion of a rim of the wheel, said contactor being carried by said base for generally transverse movement on both the seat and retaining surfaces and generally axial and radial movement with respect to the axis of rotation of the wheel, means yieldably biasing said contactor into simultaneous contact with both the bead seat and retaining surfaces of a portion of a rim of the wheel, a first displacement sensor engaging said contactor, carried by said base, and adapted for allowing radial movement of said contactor with respect to said first sensor without being radially displaced by said radial movement of said contactor and for displacement in response to generally axial movement of said contactor to sense said generally axial movement of said contactor, and a second displacement sensor engaging said contactor, carried by said base, and adapted for allowing axial movement of said contactor with respect to said second sensor without being axially displaced by said axial movement of said contactor and for displacement in response to generally radial movement of said contactor to sense said generally radial movement of said contactor, whereby rotation of the wheel on said mounting means displaces said contactor so that said first displacement sensor senses the axial runout of a rim portion of the wheel and said second displacement sensor senses the radial runout of the same rim portion of the wheel.

8. Apparatus for sensing and separating into axial and radial components the runout of first and second generally cylindrical adjacent inclined surfaces of a workpiece in which at least one of the surfaces is obliquely inclined with respect to an axis of the workpiece with comprises:

(a) a base, (b) a contactor simultaneously engageable with both of said surfaces, said contactor being mounted on said base for movement generally transverse to both of said surfaces and yieldably urged toward engagement with both of the surfaces, (c) first and second deflection sensing means operably connected to said base each having a flat surface with said flat surfaces being inclined with respect to each other and respectively generally juxtaposed to said first and second surfaces of said workpiece with said flat surfaces of said sensing means in sliding contact with said contactor, said sensing means including means yieldably urging said flat surfaces into engagement with said contactor so that said contactor is interposed between both of said flat surfaces and said first and second surfaces of said workpiece, and (d) means for mounting the workpiece for rotation about an axis of rotation of said workpiece in a direction generally parallel to said first and second surfaces at the point of contact thereof with said contactor.

References Cited

UNITED STATES PATENTS

| | | | |
|---|---|---|---|
| 2,189,631 | 2/1940 | Farmer | 33—172(B) |
| 2,687,454 | 8/1954 | Hall | 33—203.16X |
| 3,315,366 | 4/1967 | Marshall | 33—203.16X |

FOREIGN PATENTS

| | | | |
|---|---|---|---|
| 76,164 | 7/1953 | Denmark | 33—203.16 |
| 281,996 | 7/1928 | Germany | 33—203.16 |

WILLIAM D. MARTIN, JR., Primary Examiner

U.S. Cl. X.R.

33—172